(12) United States Patent
Mandewalkar et al.

(10) Patent No.: US 10,207,202 B2
(45) Date of Patent: Feb. 19, 2019

(54) HIGH FLUX ELECTROSTATIC SEPARATOR FOR SUBSEA APPLICATIONS

(71) Applicant: Cameron Solutions, Inc., Houston, TX (US)

(72) Inventors: S. Pavankumar B. Mandewalkar, Houston, TX (US); Gary W. Sams, Spring, TX (US)

(73) Assignee: Cameron Solutions, Inc., Houston, TX (US)

( * ) Notice: Subject to any disclaimer, the term of this patent is extended or adjusted under 35 U.S.C. 154(b) by 374 days.

(21) Appl. No.: 14/959,809

(22) Filed: Dec. 4, 2015

(65) Prior Publication Data

US 2017/0157536 A1 Jun. 8, 2017

(51) Int. Cl.
| | | |
|---|---|---|
| *B01D 17/04* | (2006.01) | |
| *B01D 17/06* | (2006.01) | |
| *B01D 17/02* | (2006.01) | |
| *C02F 1/48* | (2006.01) | |
| *B03C 11/00* | (2006.01) | |
| *C02F 101/32* | (2006.01) | |
| *C02F 103/10* | (2006.01) | |

(52) U.S. Cl.
CPC ........ *B01D 17/045* (2013.01); *B01D 17/0211* (2013.01); *B01D 17/0214* (2013.01); *B01D 17/06* (2013.01); *B03C 11/00* (2013.01); *C02F 1/48* (2013.01); *B03C 2201/02* (2013.01); *C02F 2101/32* (2013.01); *C02F 2103/10* (2013.01)

(58) Field of Classification Search
CPC .................................................. B01D 17/045
See application file for complete search history.

(56) References Cited

U.S. PATENT DOCUMENTS

| | | | |
|---|---|---|---|
| 3,186,933 A | 6/1965 | Gupner | |
| 3,898,152 A | 8/1975 | Hodgson | |
| 4,469,582 A * | 9/1984 | Sublette | C10G 33/02 204/666 |
| 4,581,119 A * | 4/1986 | Rajani | C10G 33/02 204/260 |
| 5,575,896 A * | 11/1996 | Sams | B01D 17/0217 204/564 |
| 6,860,979 B2 | 3/2005 | Sams | |
| 2005/0040045 A1* | 2/2005 | Nilsen | B01D 17/06 204/672 |

(Continued)

*Primary Examiner* — Bryan D. Ripa
(74) *Attorney, Agent, or Firm* — Hauptman Ham, LLP

(57) ABSTRACT

An apparatus and method for separating water from an oil-water influx are provided. The apparatus includes a separation vessel having an inlet, an oil collection portion at its upper end, and a water collection portion at its lower end. Multiple high voltage tubes, each containing an electrode, are located within the oil collection portion. These high voltage tubes are staggered in length and held in place by perforated plates. The oil-water influx flows through the inlet of the vessel into the high voltage tubes, where it is subjected to an electrostatic field. The electrostatic field causes water droplets in the influx to coalesce and form a water out-flux which flows downwardly into the water collection portion of the vessel. The remaining stream of dehydrated oil flows upwardly to the upper outlet end. The oil collection portion of the separation vessel may be oriented vertically or at an angle.

10 Claims, 2 Drawing Sheets

(56) References Cited

U.S. PATENT DOCUMENTS

| | | | |
|---|---|---|---|
| 2009/0159534 A1* | 6/2009 | Bjorklund | B01D 17/06 210/708 |
| 2010/0000867 A1* | 1/2010 | Nilsen | B01D 17/06 204/666 |
| 2011/0031124 A1* | 2/2011 | Hana | B01D 17/0217 204/671 |
| 2011/0049133 A1* | 3/2011 | Przybyla | B01D 17/06 219/647 |
| 2014/0034504 A1 | 2/2014 | Sams et al. | |

* cited by examiner

HIGH FLUX ELECTROSTATIC SEPARATOR FOR SUBSEA APPLICATIONS

REFERENCE TO PENDING APPLICATIONS

This application is not based upon any pending domestic or international patent applications.

FIELD OF THE INVENTION

This invention is in the field of electrostatic coalescence of immiscible components of a mixture, and is particularly related to the separation of water from a water-and-oil mixture.

BACKGROUND OF THE INVENTION

One of the world's most useful sources of energy is crude oil, derived from subterranean formations. When crude oil arrives at the earth's surface it is typically in the form of a water-and-oil mixture. That is, crude oil invariably has associated water that must be separated before the oil component can be efficiently refined into useful commercially acceptable products.

A common technique for improving the effectiveness of oil/water separation is by use of coalescence—that is a technique of joining together smaller into larger water droplets that are more readily separated from the mixture. As water droplet size increases, the dynamics of gravitational separation improve. One method of augmenting coalescence of water droplets is by subjecting the mixture to an electric field. Oil, being a non-polar fluid, acts as a dielectric and water droplets, being polar, when subjected to an electric field are coalesced. Coalescence is usually practiced by establishing an electric field between electrodes and passing an oil-in-water mixture through the electric field. Since water is slightly polar, water droplets become polarized by the electric field. Polarized droplets are attracted to each other and move into and coalesce with each other. Larger droplets tend to gravitate downwardly within the mixture and the oil, having portions of the water removed therefrom, tends to gravitate upwardly within the mixture.

However, most conventional oil-and-water separators are designed to treat feed streams with low velocities. As a result, they are only capable of treating low volumes and their overall capacity for separating mixed oil-and-water streams into water out-flux and dehydrated oil is limited. There is a need for a separation vessel that can treat higher volumes of mixed oil-and-water streams and effectively separate them into streams of water out-flux and dehydrated oil while minimizing rag volume, reducing the quantity of solids carried over to the dehydrated oil, and handling slugs of water coming through the feed stream.

SUMMARY

An apparatus for separating water from an oil-water influx is presented. The apparatus includes a separation vessel having an inlet, an oil collection portion at its upper end, and a water collection portion at its lower end. Multiple tubes, each containing an electrode, are located within the oil collection portion. The tubes are staggered in length and held in place by perforated plates. The oil-water influx flows through the inlet of the vessel into the tubes, where it is subjected to an electrostatic field. The electrostatic field causes water droplets in the influx to coalesce, forming a water out-flux which flows downwardly into the water collection portion of the vessel. The remaining stream of dehydrated oil flows upwardly to the upper outlet end. The oil collection portion of the separation vessel may be oriented vertically or at an angle relative to a horizontal plane, while the water collection portion may be oriented horizontally or at an angle relative to a horizontal plane.

A method for separating water from an oil-water influx is also presented. The method includes the steps of passing the influx through an inlet in the separation vessel to a plurality of tubes in the oil collection portion of the vessel, subjecting the influx to an electrostatic field, and coalescing water droplets in the influx to separate it into streams of water-outflux and dehydrated oil. The water-outflux flows downwardly into the water collection portion of the vessel, ultimately leaving the vessel through the lower outlet end. The dehydrated oil flows upwardly and exits the vessel through the upper outlet end.

Using apparatus described herein can (1) improve the performance of the oil-and-water separation vessel; (2) minimize rag volume and the occurrence of upset conditions, including but not limited to slugs of water in the feed stream, that may affect the performance of the separation vessel; (3) improve the quality of the water out-flux and the dehydrated oil stream leaving the separation vessel; (4) provide equipment with a simple configuration; and (5) minimize the amount of space needed for the separation vessel.

A better understanding of the concepts will be obtained from the following detailed description.

BRIEF DESCRIPTION OF THE DRAWINGS

Embodiments of the invention will now be described in further detail. Other features, aspects, and advantages of the present invention will become better understood with regard to the following detailed description, appended claims, and accompanying drawings (which are not to scale) where:

FIG. 3 is a cross-sectional diagram showing how the electrodes in the high voltage tubes may be grouped together and connected to multiple power units, according to an embodiment.

FIG. 4 is a cross-sectional diagram showing how the electrodes in the high voltage tubes may be grouped together and connected to a single power unit, according to an embodiment.

DETAILED DESCRIPTION

It is to be understood that the concepts now to be described are not limited in its application to the details of the construction and arrangement of the parts illustrated in the accompanying drawings, other embodiments capable of being carried out in a variety of ways. The phraseology and terminology employed herein are for purposes of description and not limitation.

Elements shown by the drawings are identified by the following numbers:

| 10 | Separation vessel | 15 | Inlet |
| --- | --- | --- | --- |
| 20 | Oil collection portion | 25 | Upper outlet end |
| 30 | Water collection portion | 35 | Lower outlet end |
| 40 | High voltage tube | 45 | Electrode |

| | | | |
|---|---|---|---|
| 50 | Longitudinal axis | 55 | Inlet flange fitting |
| 65 | Momentum absorber plate | 70 | Outlet flange fitting |
| 75 | Pipe outlet fitting | 80 | Water level |
| 85 | Water level control | 90 | Tube inlet |
| 95 | Tube outlet | 100 | Perforated plate |
| 105 | Power unit | | |

Systems and methods for separating water from a water-and-oil mixture, particularly for separating water from crude oil, are provided. A great deal of the energy consumed on the earth today is derived from crude oil that is found in subterranean deposits and brought to the earth's surface by wells. When the crude oil reaches the earth's surface it usually is in the form of a water-and-oil mixture. That is, crude oil is usually found associated with water. In order to successfully and economically transport, refine, and make use of crude oil, one of the first operations after the crude oil is brought to the earth's surface is to separate out and properly dispose of the water content.

Figure 1:
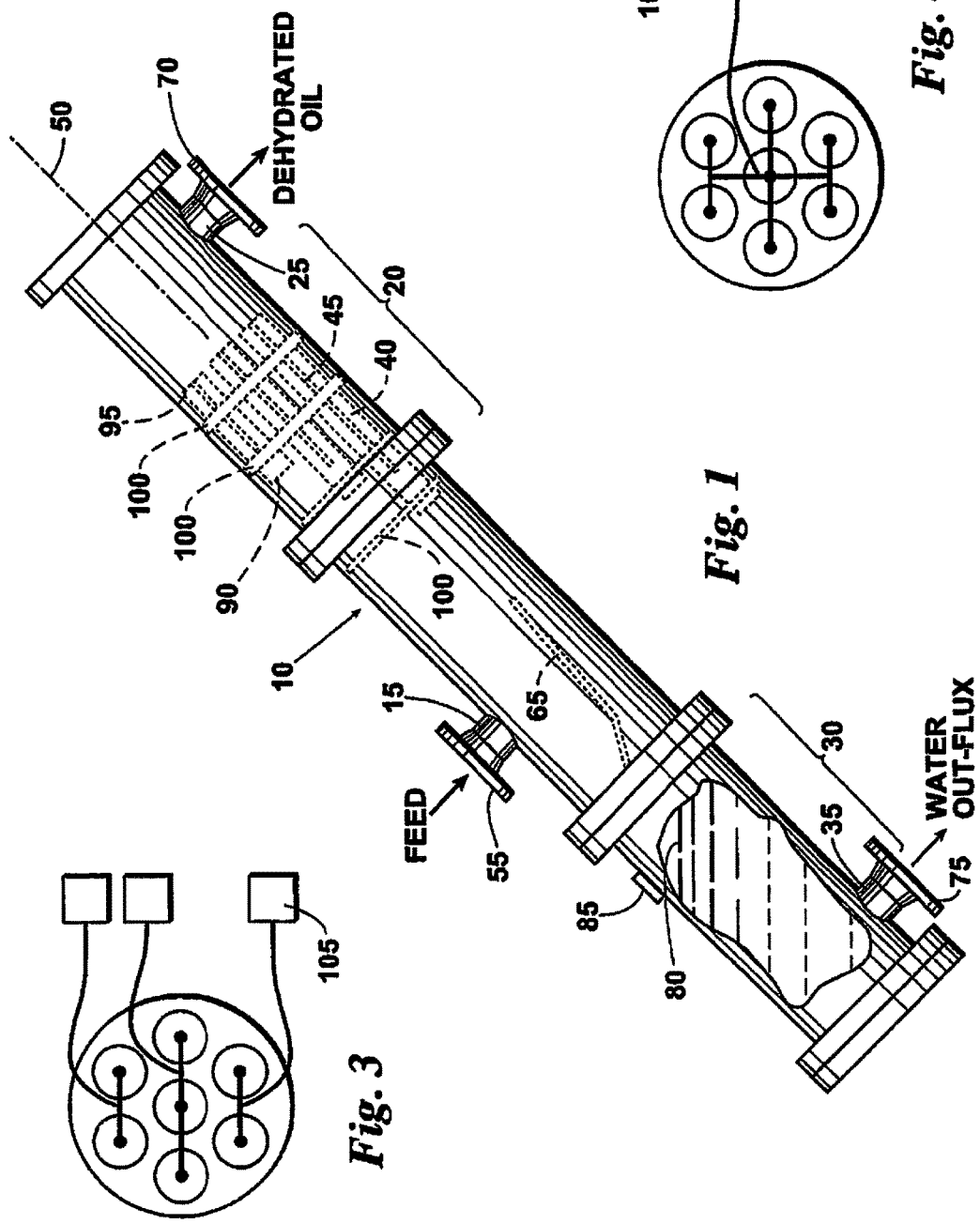
FIG. 1 is an elevational view of an electrostatic separation vessel, according to an embodiment.

Referring to FIG. 1, an embodiment of the invention includes a separation vessel 10 having an inlet 15, an oil collection portion 20 leading to an upper outlet end 25, and a water collection portion 30 leading to a lower outlet end 35. Multiple high voltage tubes 40 of staggered lengths are located in the oil collection portion 20, with each high voltage tube 40 containing an electrode 45. The high voltage tubes 40 are made of a conductive material so that an electrostatic field is established between each electrode 45 and the wall of the high voltage tube 40. The oil-water influx, identified as "feed" in FIG. 1, flows through the inlet 15 and toward the high voltage tubes 40. As the oil-water influx encounters the electrostatic field, water droplets in the influx coalesce and fall into the water collection portion 30 of the separation vessel 10 while the dehydrated oil flows to the upper outlet end 25.

The separation vessel 10 provides passageways for downward flow of the separated water out-flux from the high voltage tubes 40 and the upward flow of dehydrated oil. The oil collection portion 20 of the separation vessel 10 is elongated with respect to the diameter, that is, the oil collection portion has a length measured from the upper outlet end 25 to the beginning of the water collection portion 30 that is a multiple of the largest cross-sectional dimension of the oil collection portion 20. The length of the oil collection portion 20 may be determined by the characteristics of the oil to be processed and the extent of treatment required. In order to conserve space, the oil collection portion 20 of the separation vessel 10 may be oriented vertically or at an angle. Orienting the oil collection portion at an angle also provides for gravity-assisted separation of the oil-water influx into water out-flux and dehydrated oil. The angle of the oil collection portion 20, measured along its longitudinal axis 50, can range from 15° to 90° relative to horizontal. In the embodiment illustrated in FIG. 1, the oil collection portion 20 is in the form of a pipe and is sloped at an angle of approximately 45°.

The water collection portion 30 of the separation vessel 10 may be any shape, including but not limited to spherical, cylindrical, or frusto-conical. As shown in the embodiment of FIG. 1, the water collection portion 30 may be cylindrical, have the same cross-sectional area as the oil collection portion 20, and be oriented at the same angle as the oil collection portion 20. Alternatively, the water collection portion 30 may be oriented parallel to the horizontal plane or at a different angle than the oil collection portion 20. The water collection portion 30 of the separation vessel 10 may have a greater volume that the oil collection portion 20. Like the length of the oil collection portion 20, the volume of the water collection portion 30 may be determined by the characteristics of the oil to be processed and the extent of treatment required. For example, larger volumes may be required when the water content of the oil-water influx is relatively high.

The inlet 15 through which the oil-water influx enters the separation vessel 10 may be located above the water collection portion 30 and below the high voltage tubes 40 in the oil collection portion 20. An inlet flange fitting 55 is secured to the end of the inlet 15 that first receives the oil-water influx. The inlet flange fitting 55 provides a convenient device for connecting the system of FIG. 1 to piping but is not otherwise involved in the performance of the system.

The flow of the oil-water influx may be distributed by one or more baffles (not shown), which are located below the high voltage tubes 40. The baffles, which are preferably oriented parallel to the longitudinal axis 50 of the separation vessel 10 may be vertical, horizontal, or angled. Vertical baffles decrease the Reynolds Number and, therefore, system turbulence. Horizontal baffles decrease the Reynolds Number and settling distance but increase the number of surfaces on which sand may accumulate. Angled baffles—that is, a baffle oriented between 0° and 90°—may combine the advantages of vertical and horizontal baffles, providing shorter settling distances and an increased angle of repose for the sand.

Depending upon the application, a momentum absorber plate 65 may be installed in the separation vessel 10 opposite the inlet 15 in order to channel the flow of the oil-water influx toward the high voltage tubes 40 within the oil collection portion 20 of the separation vessel 10, to absorb some of the momentum of the oil-water influx, and to prevent mixing of the oil-water influx with the separated water out-flux from the high voltage tubes 40. For high volume feed streams, additional flow-distributing plates or perforated baffles may be installed to help distribute flow evenly through the high voltage tubes 40.

The separation vessel 10 is divided into a water collection portion 30 and an oil collection portion 20. In the embodiment in FIG. 1, the water collection portion 30 of the separation vessel 10 is located below the oil collection portion 20. An outlet flange fitting 70 is secured to the side (as shown in FIG. 1) or the top of the upper outlet end 25 of the separation vessel 10, while a pipe outlet fitting 75 is secured to the lower outlet end 35 of the separation vessel 10. These fittings provide a convenient device for connecting the system of FIG. 1 to piping but are not otherwise involved in the performance of the system.

Within the water collection portion 30 of the separation vessel 10, water is maintained at a selected water level 80 by means of a water level control 85. The water level control 85 is illustrated diagrammatically since such devices are frequently and customarily used in oil-and-water separation and are well known to practitioners in the art. As an example, the water level control 85 may operate a valve (not shown) connected to the pipe outlet fitting 75 to drain the accumulated water from the separation vessel 10 so that the water level 80 stays at a pre-selected height within the water collection portion 30. For feeds with high sand content, a Mozley™ fluidizer (Cameron, Houston, Tex.), a HydroTrans™ solids transport device (Cameron, Houston, Tex.), or an equivalent system may be used to remove sand that collects at the bottom of the separation vessel 10.

Two or more high voltage tubes 40 are located within the oil collection portion 20 of the separation vessel 10. More specifically, the high voltage tubes 40 are located between the inlet 15 and the upper outlet end 25 and above the water level 80. The number of high voltage tubes 40, as well as their diameter, length, and arrangement, may be determined by the type of oil being treated and the desired outlet specification. FIG. 1 shows the high voltage tubes 40 with the tube inlet 90 oriented toward the lower outlet end 35 of the separation vessel 10 and the tube outlet 95 oriented toward the upper outlet end 25 of the separation vessel 10. However, depending upon the application, the tube inlet 90 and the tube outlet 95 may be reversed or combined.

Figure 2:
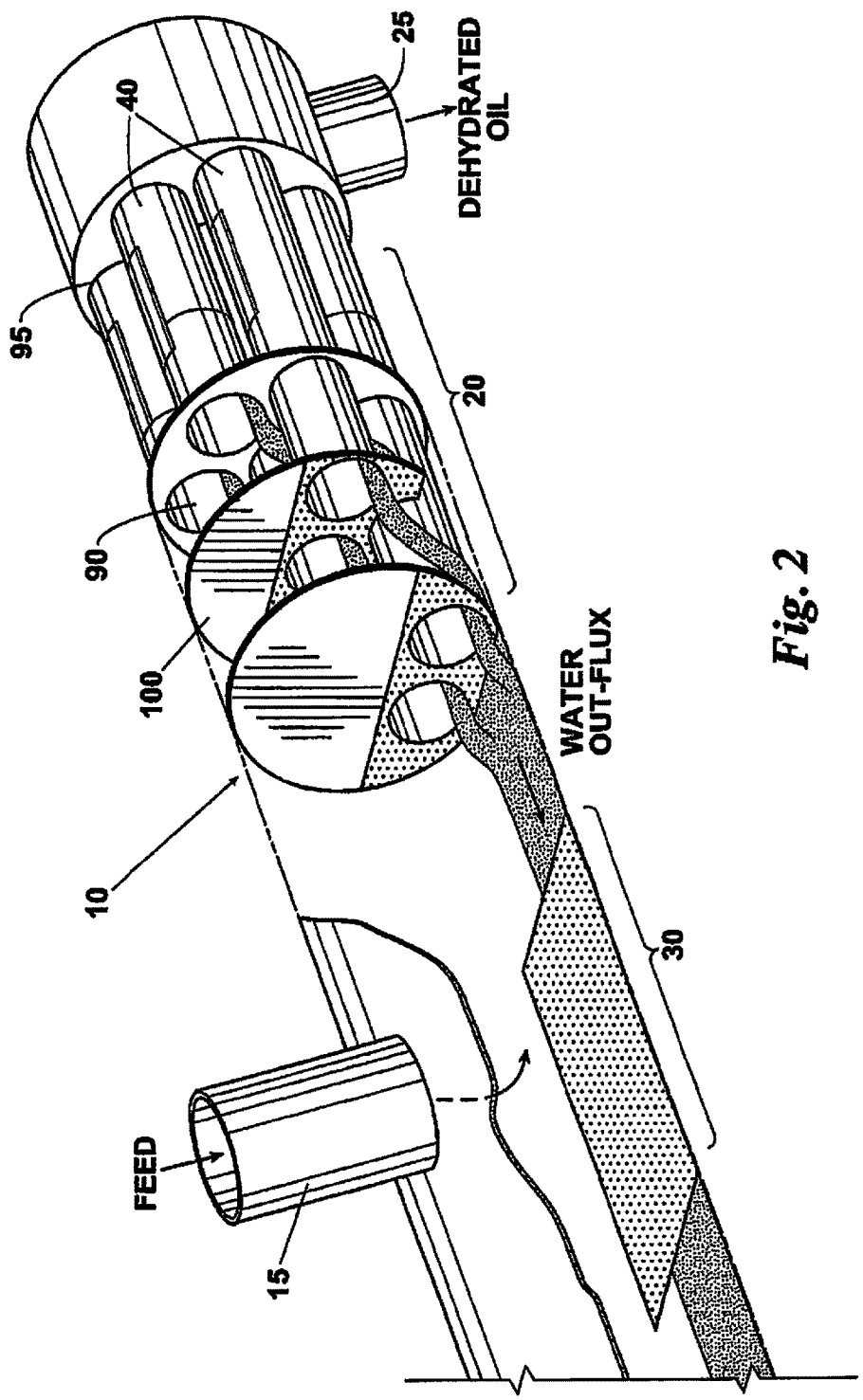
FIG. 2 is a view of an electrostatic separation vessel showing the interior of the vessel, the staggered lengths of the high voltage tubes, and the perforated plates that secure the high voltage tubes in place, according to an embodiment.

Each high voltage tube 40 is cylindrical and has a diameter that is less than the diameter of the separation vessel 10. Because structural support is provided by the separation vessel 10, the high voltage tubes 40 may have relatively thin walls, which provides flexibility for spacing the tubes 40 inside the separation vessel 10. The lengths of the high voltage tubes 40 are staggered. For example, as shown in FIG. 2, the shortest high voltage tubes 40 may be located against one side of the separation vessel 10, and the length of the tubes 40 may gradually increase so that the longest high voltage tubes 40 are located against the opposite side of the separation vessel 10. Each high voltage tube 40 is held in place by a perforated plate 100. Fixing the position of the tubes 40 ensures that the pressure drop is consistent across all tubes 40 regardless of their length, which helps to keep the flow of oil-water influx into each tube 40 relatively constant. The tubes also separate the oil-water influx from the water out-flux, which provides a consistent voltage gradient in each tube and prevents shorting of electrodes. Further, like the separation vessel 10, the tubes 40 may be angled to enhance oil-water separation. The angle of the tubes 40 and the angle of the separation vessel 10 may be, but do not have to be, equal.

An electrode 45 is positioned within each high voltage tube 40 in the separation vessel 10, which subjects the oil-water influx flowing through the tube 40 to an electrostatic field. As an example, the electrode 45 may be in the form of a coil conductor that receives the voltage applied through an insulator in the wall of the separation vessel 10. The electrode 45 may be insulated or in appropriate applications may be bare, that is, in electrical contact with the mixture liquid flowing through the vessel 10. Each of the electrodes 45 may be supplied by a voltage potential which may be an AC voltage, a DC voltage, a rectified AC voltage, or an AC voltage having selected frequencies and wave forms. An effective voltage format for use with the electrostatic separator system of this invention is a dual frequency voltage as described in detail in U.S. Pat. No. 6,860,979 entitled "Dual Frequency Electrostatic Coalescence." This patent issued on May 1, 2005, and is incorporated herein by reference.

Depending on the inlet and outlet specifications for percent basic sediment and water ("% BSW") and American Petroleum Institute ("API") gravity of crude oil and on the power demand, the individual electrodes 45 may be grouped together and connected to multiple power units 105, as shown in FIG. 3, or to a single power unit 105, as shown in FIG. 4. The design of the power unit 105 may be based on the physical location of the separation vessel 10 and the type of emulsion. Potential alternatives for the power unit 105 may include, but are not limited to, single-phase 50-60 Hz AC with a 100% reactance transformer or a single- or three-phase high frequency AC transformer. In addition, either of these options may be combined with a voltage modulation system, a DC rectifier system, or an AC/DC rectifier system.

This system for separating water from a water-in-oil mixture is of ultimate simplicity compared to most oil/water separation equipment in use today and yet is arranged to provide improved performance. Specifically, a unique aspect of the separation system is that the oil-water influx is subjected to an electrostatic field and immediately thereafter separates with the water component flowing in one direction and the oil component flowing in an opposite direction. Further, the sloped arrangement of the separation vessel allows gravity to assist in the separation of the water out-flux and the dehydrated oil. This apparatus provides the most immediate and effective separation of oil and water in the simplest possible flow arrangement as compared with other known systems.

The separation process begins when the oil-water influx or "feed" enters the separation vessel 10 through the inlet 15. Once inside the vessel 10, some of the larger water droplets in the oil-water influx may immediately coalesce, separate from the remaining portion of the influx, and flow downwardly within the separation vessel 10 into the water collection portion 30.

The remainder of the oil-water influx is carried upwardly into the high voltage tubes 40 in the oil collection portion 20 of the separation vessel 10. As the oil-water influx moves through the high voltage tubes 40 and is exposed to the electrostatic field between the electrodes 45 and the water level 80, which is created by the electrodes 45, water droplets in the influx coalesce into larger droplets. The coalesced droplets then separate from the oil-water influx, drop onto the interior of the high voltage tube 40, and move downwardly through the tube inlet 90 to the water collection portion 30 of the separation vessel 10. As shown in FIG. 2 for an inclined separation vessel 10, the separated water out-flux from the shorter high voltage tubes 40 drains across the longer tubes without contacting the oil-water influx flowing into the tube 40 below. This provides a consistent voltage gradient inside each tube 40 and prevents shorting of electrodes 45 with the ground or water interface. Ultimately, the coalesced water droplets exit the separation vessel 10 through the pipe outlet fitting 75. In contrast, the dehydrated oil continues to move upwardly and exits the high voltage tube 40 through the tube outlet 95. The dehydrated oil then flows through the upper outlet end 25 of the separation vessel 10 through outlet flange fitting 70 for, as an example, transportation to a pipeline where it may be moved to a refinery or conveyed to a facility for storage or further processing.

FIG. 1 and FIG. 2 show an embodiment of the invention that is comprised of a single inclined separation vessel 10 with an upper oil collection portion 20 and a lower water collection portion 30. However, depending upon the application, the oil collection portion and the water collection portion may be reversed or the water collection portion may have a different size, shape, and orientation than the oil collection portion. In addition, multiple separation vessels may be arranged in a series or in parallel. Series or parallel arrangements may increase the overall percentage of water removed from the oil-water influx and allow the system to adjust for the varying quantities of crude oil being treated.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of separating water from a water-and-oil mixture, the method comprising:
   flowing an oil-water influx into an inlet of an inclined separation vessel having an oil collection portion and a water collection portion,
   passing the oil-water influx in a same direction through a plurality of tubes in the oil collection portion of the inclined separation vessel, wherein the oil-water influx is subjected to an electrostatic field within the tubes, each tube being oriented at a same incline as that of the inclined separation vessel, at least one tube of the plurality having a different length than at least one other tube of the plurality, and
   coalescing water droplets in the oil-water influx to separate the influx into a water-outflux and a stream of dehydrated oil.

2. The method according to claim 1 wherein the oil collection portion is located above the inlet of the inclined separation vessel and a water collection portion is located below the inlet of the inclined separation vessel.

3. The method according to claim 1 wherein each of the tubes includes a solid wall extending from an inlet end to an outlet end of the tube.

4. The method according to claim 1 wherein the electrostatic field is generated by an electrode located within each of the tubes.

5. The method according to claim 1 further comprising: flowing the water out-flux from the tubes to the water collection portion of the inclined separation vessel.

6. The method according to claim 1 further comprising: flowing the stream of dehydrated oil from the tubes to an upper outlet end of the inclined separation vessel.

7. The method according to claim 1 further comprising: using a momentum absorber plate to channel the flow of the oil-water influx toward the tubes.

8. The method according to claim 1 wherein an inlet end of the at least one tube and an inlet end of the at least one other tube are staggered relative to one another in a longitudinal direction of the tubes, and an outlet end of the at least one tube and an outlet end of the at least one other tube are even with one another in the longitudinal direction.

9. The method according to claim 1 wherein the tubes are secured in a fixed position by a perforated plate.

10. The method according to claim 1, wherein the inlet ends of the tubes do not overlap one another when viewed in a longitudinal direction of the inclined separation vessel.

* * * * *